July 22, 1969  S. A. CUNNINGHAM ET AL  3,457,248

POLYOLEFIN RECOVERY FROM SOLUTION BY FLASHING AND CHOPPING

Filed Dec. 3, 1964

INVENTORS
S. A. CUNNINGHAM
S. J. MARWIL
BY Young & Quigg
ATTORNEYS

United States Patent Office 3,457,248
Patented July 22, 1969

3,457,248
POLYOLEFIN RECOVERY FROM SOLUTION BY FLASHING AND CHOPPING
Sheldon A. Cunningham, Borger, Tex., and Stanley J. Marwil, Bartlesville, Okla., assignors to Phillips Petroleum Company, a corporation of Delaware
Filed Dec. 3, 1964, Ser. No. 415,773
Int. Cl. C08f 1/88, 1/92; C08d 5/00
U.S. Cl. 260—93.5      7 Claims

ABSTRACT OF THE DISCLOSURE

Dry, sized polyolefin particles are obtained by flashing polyolefin solution in a vessel containing a rotating chopper. The resulting solvent vapor and solid polymer particles are thereafter discharged upwardly through a sizing screen and passed to a separating means such as a cyclone separator. Some overhead vapor from the cyclone is recycled to the chopper to act as transport medium for the polymer particles. Dry polymer is thereafter passed from the separator into an extruder for further processing.

---

This invention relates to the production and recovery of solid polymers. In one aspect it relates to the recovery of a normally solid polymer from solution in the solvent. In another aspect the present invention relates to a method and apparatus for transforming low density polymers into an easily handled form.

Several different processes are known in the art for the production of polymers such as polyethylene, polypropylene, polybutadiene, and polystyrene. Many of these known processes require recovery of the polymer from a solvent solution. This recovery can be effected by evaporation of the solvent. The solution can be sprayed through a nozzle into an evaporation chamber where the solvent is evaporated by heating and/or pressure reduction, for example, flashing in a vacuum. An advantage of vacuum flashing is that the polymer can be recovered at a temperature below its melting point. In such a process it is often desirable to recover the polymer as a particulate, flowable, solid residue. However, it has been found that certain polymers, e.g., polyethylenes having molecular weights from about 5,000 to about 200,000 impart extraordinarily high viscosities to solutions thereof in hydrocarbons such as 2,2,4-trimethylpentane and cyclohexane even when the concentration of such a solution is 10 weight percent polymer or less. Often when such a solution is forced through a nozzle into an evaporator, the residue (polymer) is obtained in the form of low-density strands or filaments rather than in the preferred form of high-density particles or granules.

According to this invention, a process and apparatus is provided for recovering normally solid polymer from a solution. In one embodiment, the polymer solution is flashed into a chamber which houses a chopping and blowing means, the polymer residue is comminuted and carried from the chamber through a sizing screen by vapor circulated by the blowing means to a "cyclone" gas-particle separator, where the polymer particles are directed to a polymer extruding apparatus. Preferably, carrier gas is recycled to the flashing and chopping chamber.

An object of this invention is to provide a method and apparatus for treating rope-like polymer residues so that a granular or particular solid transferable by so-called "fluidized solid" techniques is obtained.

Another object of the present invention is to provide an improved method and apparatus for separating the polymerization solvent of a normally solid polymer and rendering the polymer suitable for molding.

A still further object of this invention is to provide an improved apparatus for converting low density bulk polymer into a form easily handled by common engineering techniques.

Other objects and advantages will be apparent to those skilled in the art from the following description and drawing in which.

Figure 2:
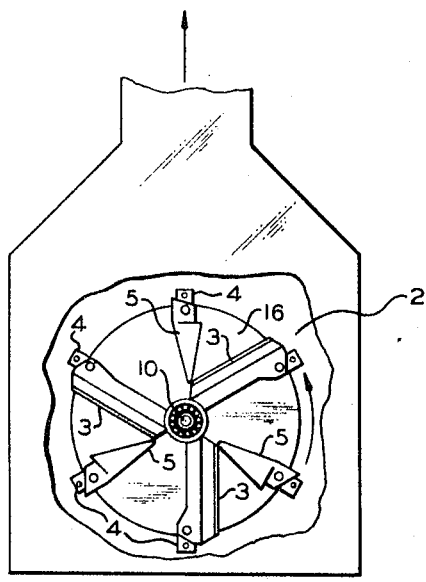
FIGURE 2 is a perspective view of a rotor wheel suitable for use by this invention.

Referring now to FIGURE 2, which depicts the rotor 16 housed within the evaporation chamber 2, the rotor member consists essentially of multiple elongated knife blades 3 extending radially from the rotor axis 10, groups of rectangular metal plates 4 positioned near the perimeter of said rotor 16, and fan blades 5 designed to move substantial volumes of vapor.

Figure 1:
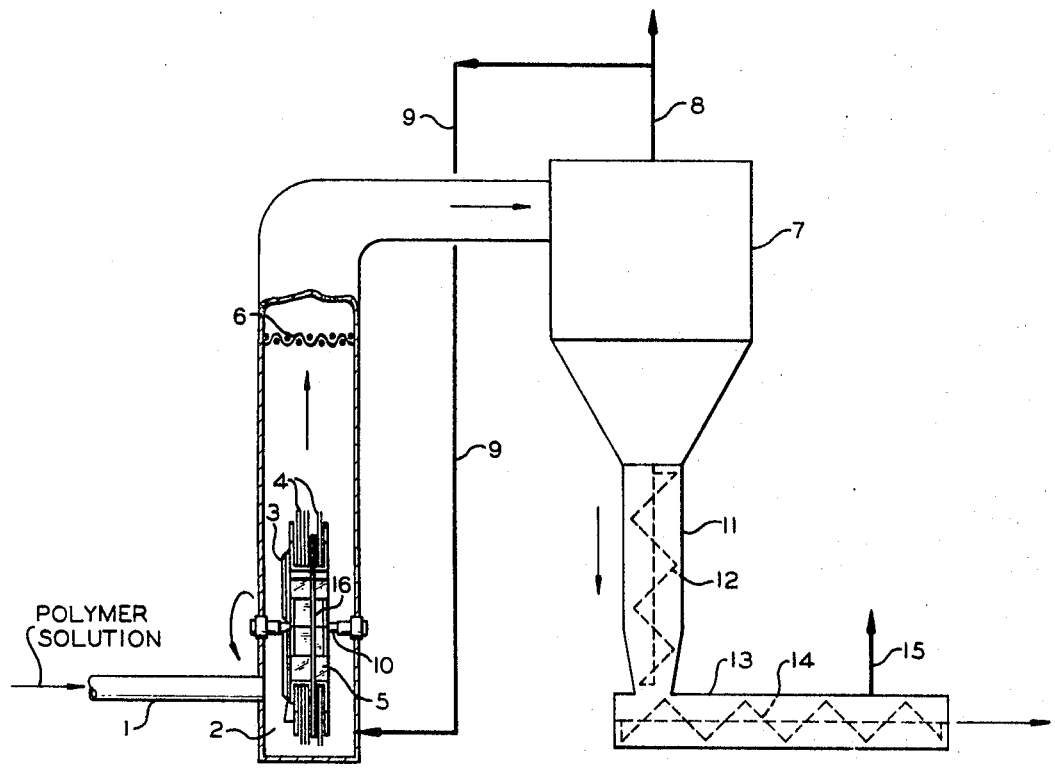
FIGURE 1 is a diagrammatic illustration of an apparatus incorporating the various aspects of this invention.

Referring now to FIGURE 1, a polymer solution is flashed into evaporation chamber 2 through nozzle 1. Rotor 16 within evaporation chamber 2 is turning at a high rate of speed on shaft 10. Chamber 2 is at reduced pressure and at a temperature below the melting point of the polymer in solution and a substantial portion of the polymer solvent is immediately vaporized and forced out of chamber 2 through screen 6 by fan blades 5. The solidified polymer is propelled by the force of nozzle 1 onto rotor 16 where it is cut by blades 3 and pulverized further by hammers 4. When the solidified polymer is reduced sufficiently in size, the polymer particles are lifted by vapor currents circulated by fan blades 5 and carried overhead from chamber 2 through sizing screen 6 and into cyclone separator 7. The cyclone separator 7 extracts the polymer particles from their carrier volume of vapor and the particles drop into collector 11 where feed auger 12 forces them into a coupled polymer extruder 13. The polymer particles are compressed and kneaded into a molten state by auger 14 in extruder 13 and any remaining traces of polymerization solvent are extracted from the polymer through port 15. The vaporized solvent leaves separator 7 through conduit 8 for subsequent condensation. A portion of this gas can be recycled through evaporation chamber 2 to conduit 9 to provide a lifting medium for carrying additional polymer particles from evaporation chamber 2. This recycle gas can be heated in conduit 9 for additional drying of polymer particles as they move into separator 7 which results in less solvent extraction required by extruder 13.

The cutting and pulverizing rotor hereinabove prescribed for use in sizing low density polymer is of the type previously used for preparing agricultural feeds; i.e., the grinding of hay, grains, and sorghums. The machine making use of such a rotor assembly for grinding agricultural feeds is commonly called a hammermill. Hammermills are also used for other grinding purposes such as the pulverizing of rock, and the machines are manufactured commercially by a number of firms. The machine used by these inventors for testing its usefulness in treating low density bulk polymer was manufactured by Wetmore Pulverizer and Machinery Company, Tonkowa, Okla., and is described as Model 450 in literature published by that firm. Only the rotor assembly of Model 450 which is of single plate construction and incorporates a plurality of radial knives, superimposed and spaced flat plates arranged circumferentially about the extremities of the rotor, and hard surfaced fan blades, all in a streamlined unit, is utilized by this invention. Such a rotor assembly is placed within a closely confining evaporation chamber such as illustrated in FIGURE 2 where operating conditions can be carefully controlled.

The melting point of polymers will vary depending upon the physical and chemical nature and origin of the polymer. Polyethylenes ordinarily range in melting point from about 210° to 260° F. Polyethylenes prepared by the process of Hogan and Banks, U.S. Patent 2,825,721, ordinarily have melting points in the range of 240–260° F. but can have melting points outside this range.

The recovery process of this invention is particularly applicable to the recovery of the polymer produced in the process of the type disclosed and claimed in the above-mentioned Hogan and Banks patent wherein an aliphatic 1-olefin having a maximum chain length of 8 carbon atoms and no branching nearer the double bond than the 4 position, is subjected to polymerization conditions in the presence of a catalyst comprising chromium oxide, of which a substantial portion of the chromium is hexavalent, associated with at least one oxide selected from the group consisting of silica, alumina, zirconia, and thoria. The chromium content of the catalyst is ordinarily a minor proportion, preferably from 0.1 to 10 weight percent. Polymerization is ordinarily conducted at a temperature in the range of 150–450° F. The reacted olefin, for example ethylene and/or propylene is often, though not necessarily subjected to the polymerization conditions in admixture with a hydrocarbon solvent which is inert and can exist as a liquid at the polymerization temperature. Suitable solvents of this class are normally liquid naphthenes such as cyclopentane, cyclohexane, methyl cyclopentane, methyl cyclohexane, and paraffinic hydrocarbons having from 3–12, preferably 5–12 carbon atoms per molecule, for example, n-hexane, isoheptane, n-octane, and 2,2,4-trimethylpentane. The reaction can be conducted as a fixed bed reaction but is in many cases conducted with a catalyst in comminuted form in suspension as a slurry in the hydrocarbon solvent. The effluent withdrawn from the reactor comprises a solution of polymer in the solvent and when a slurry or suspended catalyst is used, the effluent comprises a solution of the polymer and the solvent-suspended catalyst with undissolved polymer adhering thereto, and in many cases small amounts of unreacted olefin. The unreacted olefin can be removed by venting and/or flashing and the remaining mixture is ordinarily heated to a suitable temperature to effect substantially complete solution of the polymer in the solvent. Additional solvent can be added at this point if desired and it is ordinarily the practice to adjust the concentration of the polymer in the solution to a value in the range of approximately 2 to approximately 10 weight percent. The solution can then be filtered to remove the suspended catalyst and a solution containing from 2–10 weight percent of the polymer in the solvent is obtained from which the polymer is recovered.

Alternatively, the polymer may be prepared in solution in a so-called high-solids reactor at concentrations up to 50 percent polymer. The reactor effluent in this case is passed directly into the polymer recovery equipment of this invention without catalyst removal. Polymers so recovered are useful for fabrication into pipe, tubing, electrical insulation, and water-resistant wrappings as more fully set forth in the cited patent.

The following example is presented to more fully describe the invention, but it is not intended to be construed as limiting the invention thereto.

Example

In a run for the production of polyethylene a saturated solution of ethylene and cyclohexane is maintained in a pressure reactor equipped with a stirrer. The cyclohexane containing 20–100 mesh catalyst in suspension is supplied continuously to the reactor. Ethylene from which oxygen has been removed by contact with reduced copper oxide is supplied to the reactor as a separate stream. The catalyst is prepared by impregnating a steam aged cold precipitated gelled composite comprising 90 weight percent silica and 10 weight percent alumina with an aqueous solution of chromium trioxide, drying the resulting composite, and heating the dried composite at approximately 950° F. for about 5 hours in a stream of substantially anhydrous air. The catalyst contains a total of 2 weight percent chromium, at least half of which is in the hexavalent state.

The polymerization reaction is maintained at a temperature of approximately 300° F. and a pressure of approximately 600 p.s.i.g. Total effluent is continuously withdrawn from the reactor, heated to 315° F. and passed to a dissolution tank maintained at 315° F. and 100 p.s.i. from which unreacted ethylene and any other normally gaseous material is vented. Additional solvent is added to the total reactor effluent prior to the heating and flashing. The proportion of ethylene to total cyclohexane added upstream and downstream from the reactor is so adjusted that a solution containing approximately 5 weight percent of polyethylene in cyclohexane is obtained. After heating the effluent to approximately 315° F. and agitating to effect complete solution of the polymer in the solvent as described, the catalyst is removed by filtration at approximately 315° F. and 100 p.s.i. The resulting 5 percent solution of polyethylene is passed to a solvent evaporator maintained at 290° F. and 33 p.s.i.g. wherein approximately half of the solvent is vaporized. The unvaporized material is withdrawn from the body of the evaporator and passed to a heater wherein it is heated to approximately 310° F. Approximately half of the heated material is returned to the evaporator to supply heat thereto. The remainder of the heated material is passed to a vacuum flash tank maintained at 200° F. and 3 p.s.i.a.. The entering solution which contains about 10 weight percent polyethylene is confronted in the flash tank by a spinning rotor having radial knives, circumferential hammers, and hard surface fan blades such as the rotor described hereinabove which chops, and otherwise comminutes the filament-like material emerging from the flashed solution. The polymer residue is retained by the flash tank until it is sufficiently reduced in size to pass through a sizing screen above the flash zone, through which it is carried by solvent vapors circulated by the aforementioned fan blades on the rotor. The sized polymer particles are deposited in a cyclone separator by the carrier gas and approximately half of the carrier gas is returned to the flash zone for use in carrying more polymer particles to the cyclone separator. This recycle gas is preferable to ambient air because of its higher temperature, which is useful in drying or purging traces of polymerization solvent from the sized polymer particles. The polymer particles collected by the cyclone separator are passed to a vacuum extruder dryer (such as Model 2052B manufactured by Welding Engineers Inc.) containing a helical agitator. In the vacuum extruder-dryer the temperature is maintained between 370–450° F. by circulating hot oil through the heating jacket. The pressure within the middle chamber of the extruder dryer is maintained at approximately 30–50 mm. mercury. Molten polymer containing from 0.019 to 0.026 weight percent of solvent is extruded from the vacuum extruder-dryer and passed through an open tank containing water which cools and solidifies the polymer. The solidified polymer emerges from the cooling tank and is cut by means of a rotary cutter into cylindrical pellets which are recovered as the product of the process.

While the invention has been described in connection with a present, preferred embodiment thereof, it is to be understood that this description is illustrative only and is not intended to limit the invention.

We claim:

1. A process for recovering a normally solid thermoplastic polymer selected from the group consisting of (1) a normally solid polymer obtained by polymerizing at least one mono-1-olefin having 2–8 carbon atoms, (2) polybutadiene and (3) polystyrene from a solution thereof in a solvent which process comprises vaporizing a substantial portion of said solvent from said solution in a comminution zone at a temperature below the melting point of said polymer thereby precipitating solid polymer and forming solvent vapor, chopping the resulting solid polymer residue in said comminution zone to form particles of a predetermined size, blowing said solvent vapor from said zone thereby carrying said polymer particles in a gas flow through a sizing screen and thence to a gas-solids separation step, and thereafter recovering the solid thermoplastic particles as a product of the process.

2. A process according to claim 1 wherein said polymer is polybutadiene.

3. A process according to claim 1 wherein said polymer is polystyrene.

4. A process according to claim 1 wherein said polymer is a normally solid polymer obtained by polymerizing at least one mono-1-olefin having 2–8 carbon atoms.

5. A process for recovering a normally solid thermoplastic polymer of an olefinic hydrocarbon from a solution thereof, which process comprises vaporizing a substantial portion of said solvent from said solution at a temperature above the melting point of said polymer, subjecting the resulting polymer solution to vacuum flashing at a temperature below the melting point of the polymer to remove additional solvent therefrom, chopping the resulting solid polymer in a comminution zone to a predetermined size, carrying the polymer particles in a gas flow through a sizing screen to a storage zone where the carrier gas is separated and recycled to said comminution zone, kneading the sized, solid polymer particles at a temperature above their melting point while vaporizing a substantial proportion of any remaining solvent therefrom, solidifying the polymer so obtained, and recovering solid substantially solvent-free polymer as a product.

6. A process according to claim 5 wherein said polymer is polyethylene.

7. A method for recovering normal solid polymers from a solution thereof in a solvent which comprises expanding said polymer solution through a nozzle into a flashing chamber at reduced pressure and temperature in such a manner that said polymer solution is separated into a polymer residue and a vaporized solvent, contacting said polymer residue with a chopping means within said flashing chamber, chopping and reducing said polymer residue in size by said chopping means, then lifting such chopped and particulate polymer with volumes of gas moving radially from said chopping member and carrying said polymer particles through a sizing screen at the top of said chamber together with vaporized solvent through a conduit to a separating device, extracting said polymer particles from said gas volumes and said vaporized solvent, then recycling at least a portion of the carrier gas volumes to the above-mentioned flashing chamber, dropping said polymer particles into a storage container and passing them to a polymer extruding apparatus for kneading and further evaporation of solvent.

References Cited

UNITED STATES PATENTS

| | | | |
|---|---|---|---|
| 2,970,991 | 9/1967 | Cines | 260—949 |
| 3,038,532 | 6/1962 | Eisenkroft. | |
| 3,072,627 | 1/1963 | Cines | 260—94 |
| 3,190,867 | 6/1963 | Oldweiler | 260—94 |

JAMES A. SEIDLECK, Primary Examiner

U.S. Cl. X.R.

159—3; 260—93.7, 94.2, 94.9